US012469358B1

(12) United States Patent
Georgilas

(10) Patent No.: US 12,469,358 B1
(45) Date of Patent: Nov. 11, 2025

(54) GAMING MACHINE AND PULL TAB SYSTEM AND METHOD FOR REDUCING VOLATILITY

(71) Applicant: Justin Tilemahos Georgilas, Las Vegas, NV (US)

(72) Inventor: Justin Tilemahos Georgilas, Las Vegas, NV (US)

( * ) Notice: Subject to any disclaimer, the term of this patent is extended or adjusted under 35 U.S.C. 154(b) by 221 days.

(21) Appl. No.: 18/340,763

(22) Filed: Jun. 23, 2023

(51) Int. Cl.
*G07F 17/32* (2006.01)

(52) U.S. Cl.
CPC ...... *G07F 17/3223* (2013.01); *G07F 17/3225* (2013.01); *G07F 17/3244* (2013.01); *G07F 17/3262* (2013.01); *G07F 17/329* (2013.01)

(58) Field of Classification Search
CPC ............. G07F 17/3223; G07F 17/3225; G07F 17/3244; G07F 17/3262; G07F 17/329
USPC ........................................................... 463/25
See application file for complete search history.

(56) References Cited

U.S. PATENT DOCUMENTS

| | | | | |
|---|---|---|---|---|
| 10,832,524 B2* | 11/2020 | Hawkins | G07F 17/3216 | |
| 2009/0233683 A1* | 9/2009 | Kim | G07F 17/3244 | 463/20 |
| 2017/0076538 A1* | 3/2017 | Nicely | G07F 17/3267 | |
| 2021/0056807 A1* | 2/2021 | Hawkins | G07F 17/3211 | |
| 2022/0237986 A1* | 7/2022 | Watkins | G07F 17/3211 | |
| 2023/0252851 A1* | 8/2023 | Hawkins | G07F 17/3216 | 463/27 |

* cited by examiner

*Primary Examiner* — Pierre E Elisca
(74) *Attorney, Agent, or Firm* — FisherBroyles, LLP; Rob L. Phillips

(57) ABSTRACT

A system and method involving a finite pool database containing a plurality of finite pools populated with winning and non-winning outcomes. Once a random finite pool is selected, a random winning or non-winning outcome is selected therefrom. Depending on the selection of a winning outcome or a non-winning outcome a first or second award database is contacted and used to identify the winning or non-winning award. The system and method may be used with class II, III and pull tab games.

19 Claims, 8 Drawing Sheets

Fig. 6E
Fig. 6F
500
Lucky Streak Slot
Grand
$2,343.41
Major
$43.41
Minor
$33.41
Mini
$13.41
Featuring Lucky Streak Reels
505-5
500
Lucky Streak Slot
Grand
$2,343.41
Major
$43.41
Minor
$33.41
Mini
$13.41
Featuring Lucky Streak Reels
505-6

GAMING MACHINE AND PULL TAB SYSTEM AND METHOD FOR REDUCING VOLATILITY

FIELD OF THE INVENTION

The embodiments of the present invention relate to a system and method for creating a random number generator with reduced volatility.

BACKGROUND

Casino-style games of chance (e.g., slot machines and pull tabs), including Class III games, and their payouts are based on probabilities. The greater the odds, the greater the payout. One potential drawback of casino-style gaming is the dreaded "cold streak." That is, while playing a particular casino-style game, a player may go through an extended cold streak without being rewarded with any payouts. On a slot machine for example, a player may spin the reels 20+ times without being rewarded a payout. Such cold streaks cause players to lose interest and become frustrated. A frustrated player is not ideal for the operator as such players tend to avoid the casino-style games of chance costing the operator revenue.

The results of Class II games of chance are based on electronic bingo games involving multiple electronic gaming machines (EGMs) throughout the casino. In other words, the results are based on bingo game outcomes in the background rather than a random number generator (RNG) running on each EGM. With both systems, cold streaks may occur.

Accordingly, the new system and method detailed herein involves a system and method configured to limit or reduce cold streaks.

SUMMARY

In one embodiment of the present invention, a method comprises the use of successive finite pools of winning outcomes and losing outcomes. Once the finite pool is exhausted, the finite pool is re-set thereby assuring a maximum number of consecutive losses equivalent to 2 times the number of losing outcomes in the finite pool. In such a manner, the number of possible consecutive losses can be controlled by the cumulative losses of two finite pools with the most losses.

For example, when two consecutive finite pools are randomly selected, with a finite pool of five outcomes comprising one winning outcome and four losing outcomes (20% winning frequency), the maximum number of consecutive losing outcomes is eight (2 times four losing outcomes in the finite pool). With a finite pool of six outcomes comprising one winning outcome and five losing outcomes (16.7% winning frequency), the maximum number of consecutive losing outcomes is ten (2 times five losing outcomes in the finite pool). Therefore, by selecting the configuration of the finite pool, the operator can control the Return to Player (RTP).

Other variations, embodiments and features of the present invention will become evident from the following detailed description, drawings and claims.

DETAILED DESCRIPTION

Figure 1:
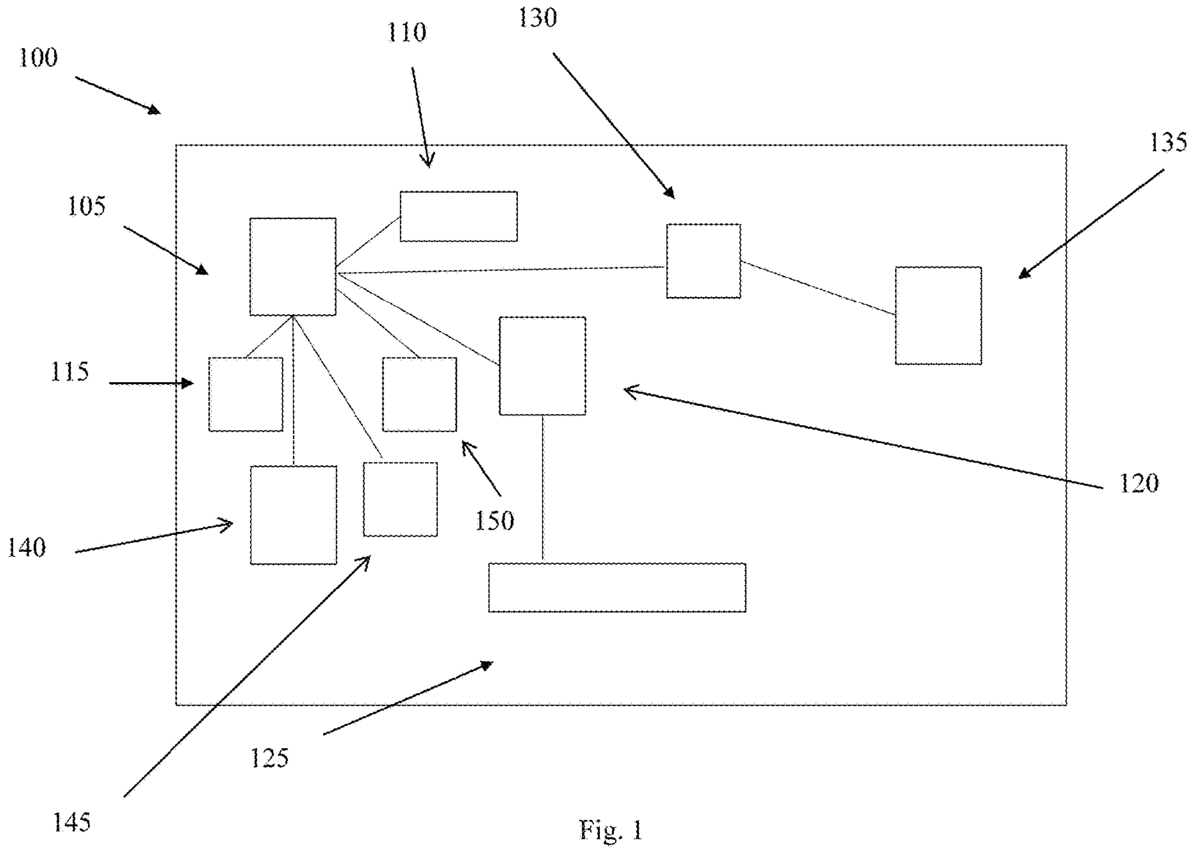
FIG. 1 illustrates a block diagram of components of an electronic gaming device for conducting a game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" or "gaming device" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention may be facilitated by an electronic gaming device whereby a single player plays against the electronic gaming device's (or machine's) processor as described herein. The electronic gaming device may be a standalone device and bar-top device forming part of a gaming device network or not. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming device 100 may be linked to a central game server which allows players to select from a number of games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. Payout system 150 includes a coupon printer or similar device for receiving money/coupon from the electronic gaming device 100.

Those skilled in the art will recognize that the configuration and features of the electronic gaming device 100 disclosed herein are exemplary and may be altered in any number of ways without impacting the embodiments of the present invention.

Figure 2:
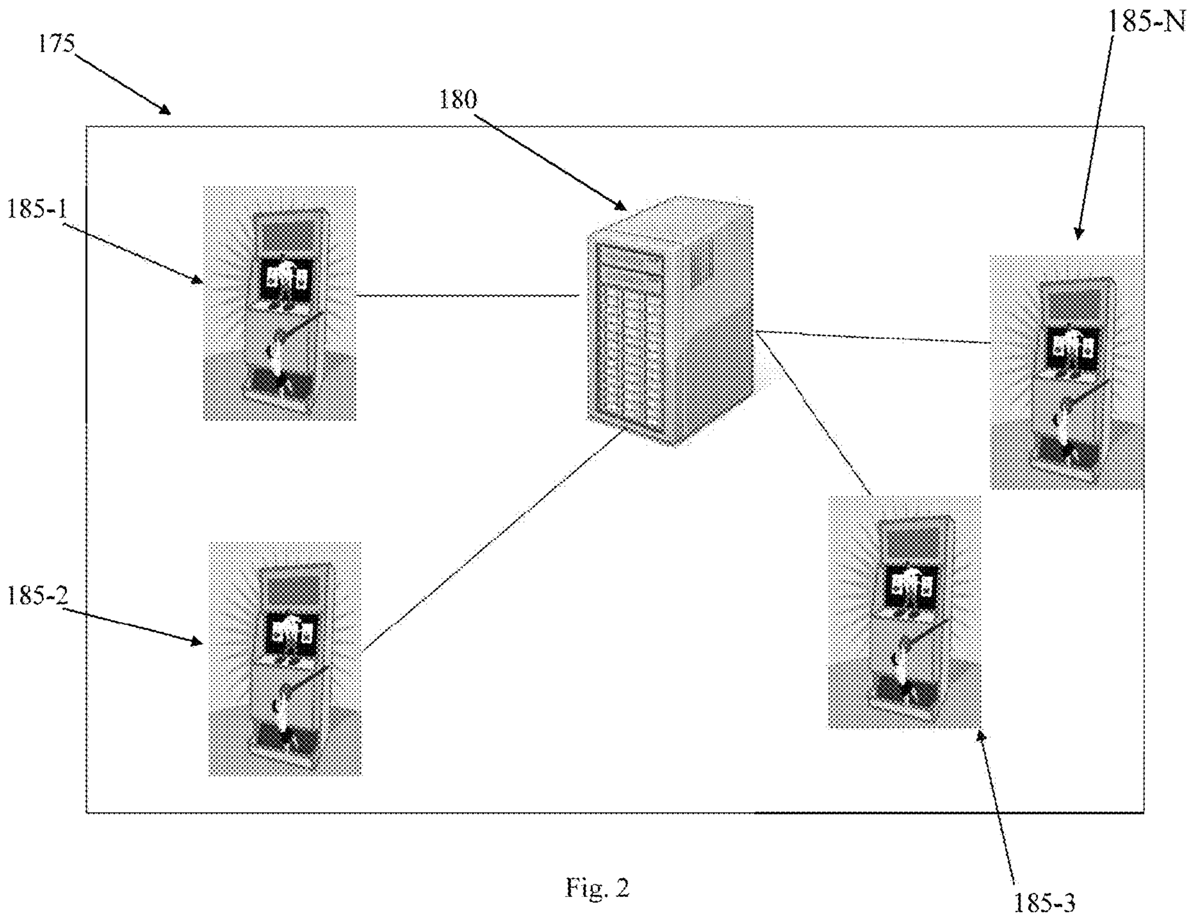
FIG. 2 illustrates a block diagram of a wireless network system including numerous slot machines according to the embodiments of the present invention.

FIG. 2 shows a block diagram of a gaming network 175 which may be used to facilitate play of the game via linked gaming devices according to the embodiments of the present invention. The gaming network 175 comprises a central processor 180 (e.g., processor-equipped game server) in communication with multiple gaming devices 185-1 through 185-N as described in FIG. 1.

Figure 3:
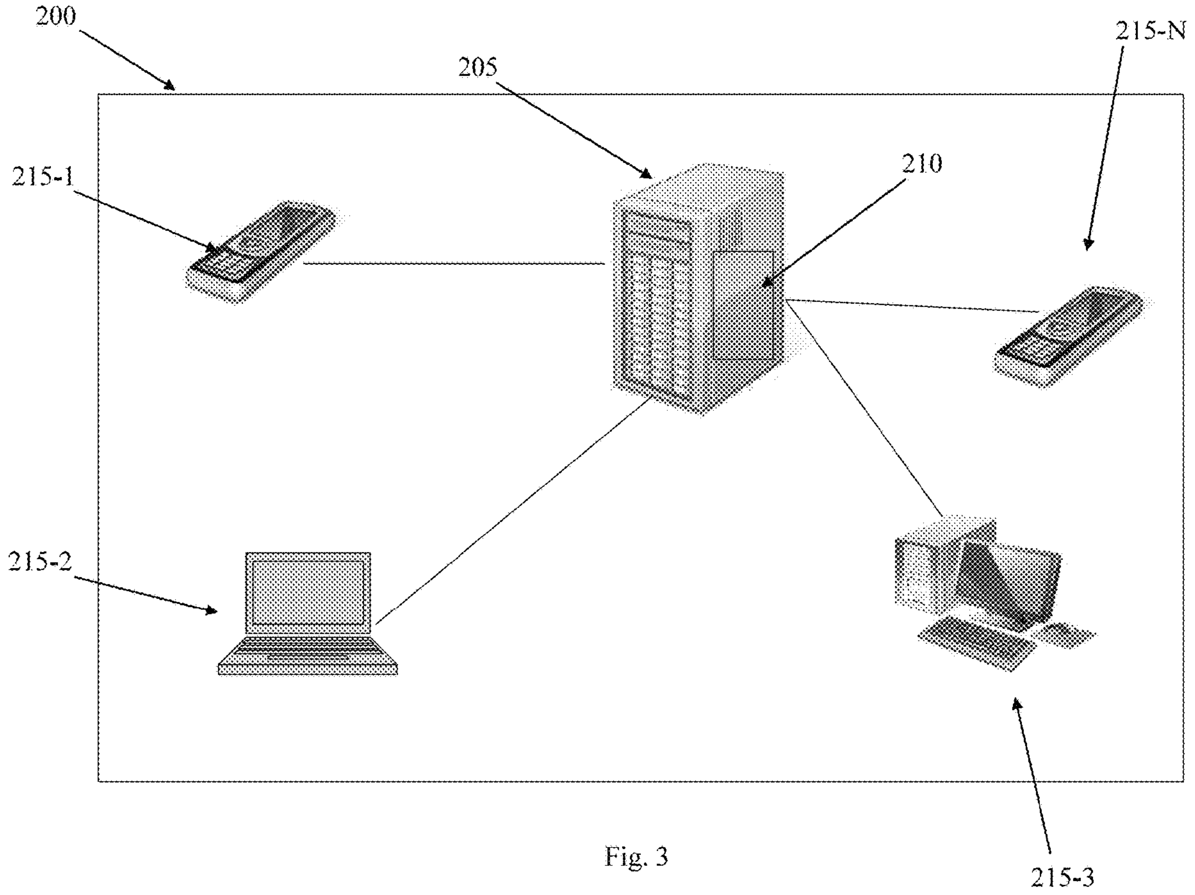
FIG. 3 illustrates a block diagram of a wireless network system accessible by mobile devices for conducting mobile games of chance according to the embodiments of the present invention.

FIG. 3 shows a block diagram of a wireless system 200 which may be used to facilitate remote play of the game according to the embodiments of the present invention. The wireless network system 200 comprises a processor-equipped game server 205, including one or more processors 210 running game software, and remote devices 215-1 through 215-N (e.g., smart phones) configured to access said game server 205 facilitating game play on the remote devices 215-1 through 215-N. In another embodiment, the video game according to the embodiments of the present invention may be in the form of a software application ("App") downloadable onto smart phones, tablets or computers and playable via processing power and a user interface associated therewith.

In one embodiment of the present invention, a plurality of gaming devices are connected to one or more servers over a network, such as a wide area network (WAN) and/or a local area network (LAN). In one embodiment, the gaming devices are electronic gaming machines, otherwise known as "slot machines." These may be classified as Class II, Class III, video lottery terminals (VLT), or the like. Electronic gaming machines may present either one or a plurality of games to the player such as video reels, video poker, video keno, video bingo, electronic table games, and the like. In another embodiment, the gaming devices are gaming kiosks or terminals. Alternatively, the gaming devices may include remote gaming devices, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a slot game to be played on a gaming device, the gaming device uses the randomization device to select the symbols which land on each space of the primary game reel matrix. In another embodiment, at least some aspects of the game are provided by one or more servers, such as a local server, a wide area server, a local area progressive server (LAP), or a wide area progressive server (WAP). The server or servers may include a randomization device for randomly selecting the symbols.

In the example of mechanical, electromechanical, or video reel machines, the games may include a number of mechanical or simulated rotating reels that are arranged in a horizontal configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

Figure 4:
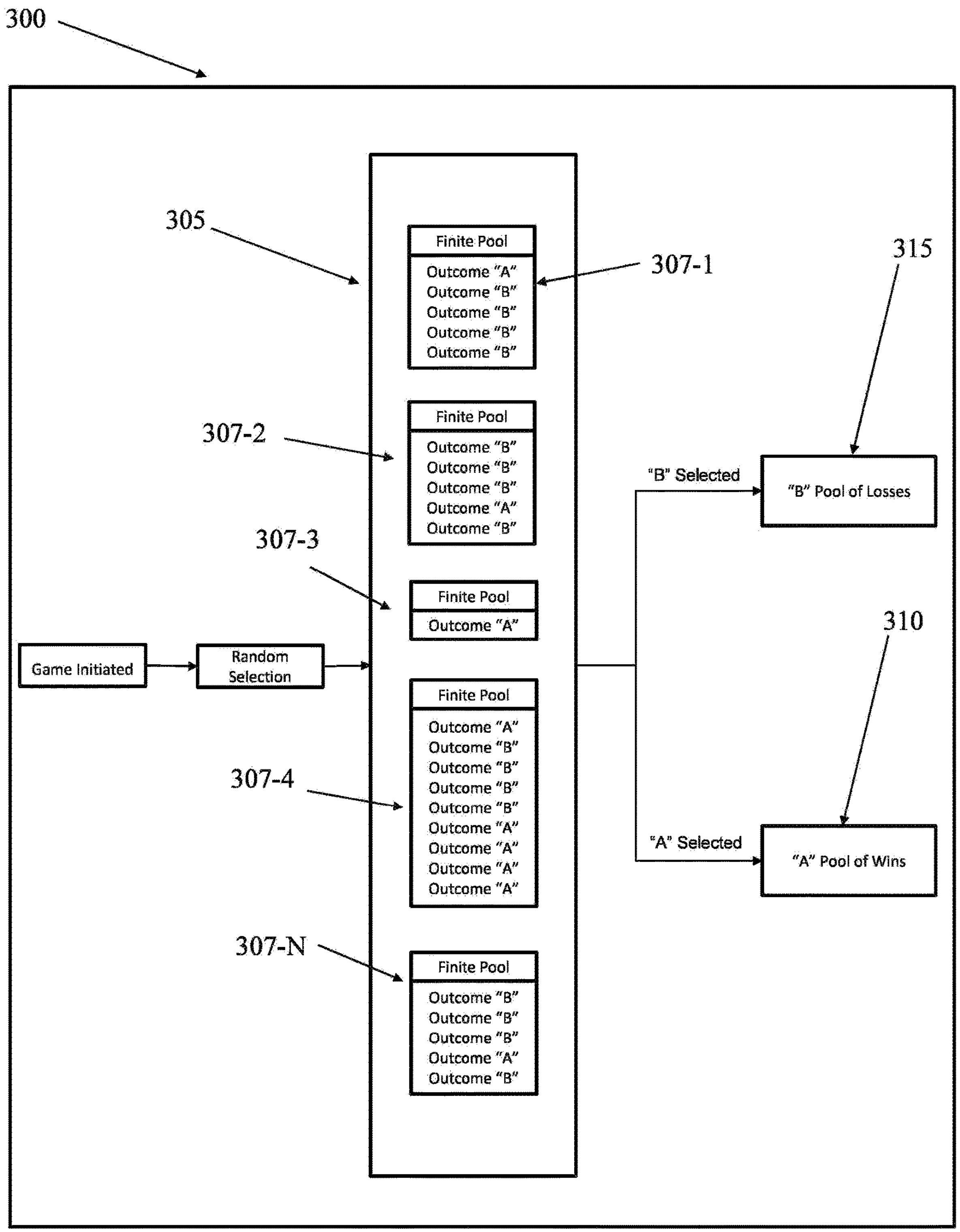
FIG. 4 illustrates a schematic diagram according the embodiments of the present invention.

FIG. 4 shows a schematic diagram 300 according to the embodiments of the present invention. A finite pool database 305 is populated with a plurality of finite pools 307-1 through 307-N populated with winning outcomes (A) and non-winning outcomes (B). As shown, the finite pools 307-1 through 307-N may be the same or different from one another. Once the finite pool 307-1 through 307-N is randomly selected, a winning or non-winning outcome is then randomly selected from the selected finite pool 307-1 through 307-N. If a non-winning outcome is randomly selected from the finite pool 307-1 through 307-N, the system advances to database B 310, populated with non-winning awards, and randomly selects one. If a winning outcome is randomly selected from the finite pool 307-1 through 307-N, the system advances to database A 315, populated with winning awards, and randomly selects one. In different embodiments, as detailed below, the selected winning awards may or may not be replaced. Once a finite pool 307-1 through 307-N is selected, all outcomes are randomly selected until deleted assuming that the player plays at the same bet and denomination.

In one embodiment (e.g., Class III games), once a winning or non-winning award is selected from database A or B, respectively, the award is replaced in the database. Alternatively, for a pull tab embodiment, the awards are not replaced. Once a finite pool 307-1 through 307-N is exhausted of outcomes, the finite pool 307-1 through 307-N may be re-set to its original condition. Those skilled in the art will recognize that the finite pools 307-1 through 307-N may take on any size and combination of winning and non-winning outcomes as desired for a given winning hit frequency. In another embodiment, the system and method may be used with class II games with databases A and B containing bingo cards. Class II games use bingo game outcomes to determine slot game outcomes.

Figure 5:
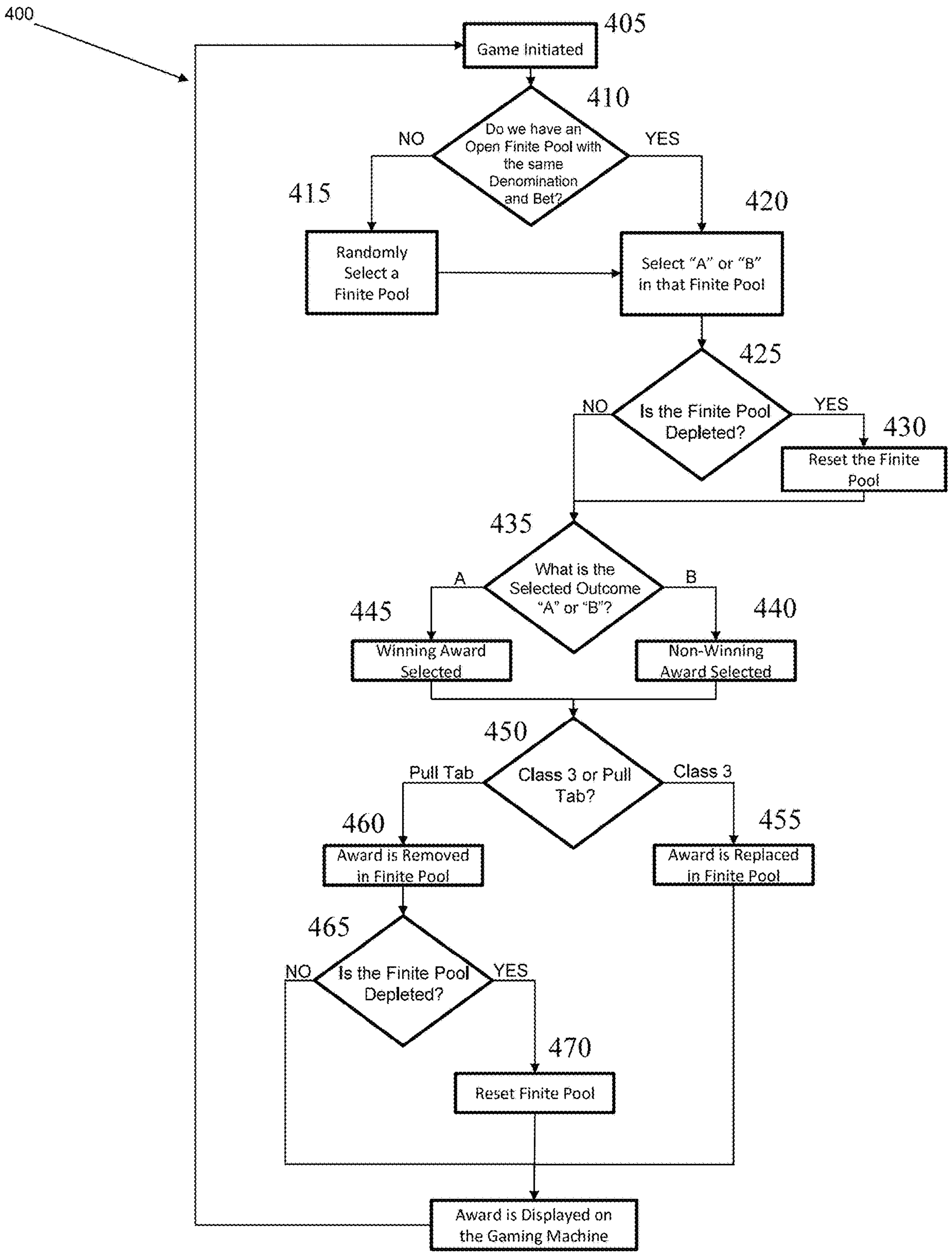
FIG. 5 illustrates a flow chart detailing one methodology according to the embodiments of the present invention.

FIG. 5 shows a flow chart 400 detailing one methodology of the using the embodiments of the present invention in conjunction with a class III slot game and pull tab game. A pull tab game involves tearing open portions of a physical ticket to reveal symbols that may result in a prize. Video versions of pull tab games are also available. In both cases, the pull tab game utilizes a finite pool of tickets (e.g., 500 tickets) and finite number of winning outcomes (e.g., 50 winning outcomes).

At 405 the game is initiated. At 410, it is determined whether a finite pool is open for the particular bet and denomination being played. That is, in one embodiment, the system uses different finite pool databases for each bet size and/or denomination being bet. If no finite pool is open for the bet size and/or denomination, at 415, a new finite pool is selected. At 420, a selection (A or B) is made from the selected finite pool. At 425, it is determined if the selected finite pool is depleted. If so, at 430, the finite pool is re-set. At 435, it is determined if the selection was A or B. If B, at 440, a non-winning award is selected. If A, at 445, a winning award is selected. Once the award type is selected, at 450, it is determined whether the game is class III or pull tab. If a class III game, at 455, the award is replaced. If a pull tab game, at 460, the award is not replaced. If at pull tab game, at 465, it is determined if the award finite pool is depleted. If yes, at 470, the award finite pool is re-set. At 475, the selected award is displayed on the EGM display.

Figure 6A:
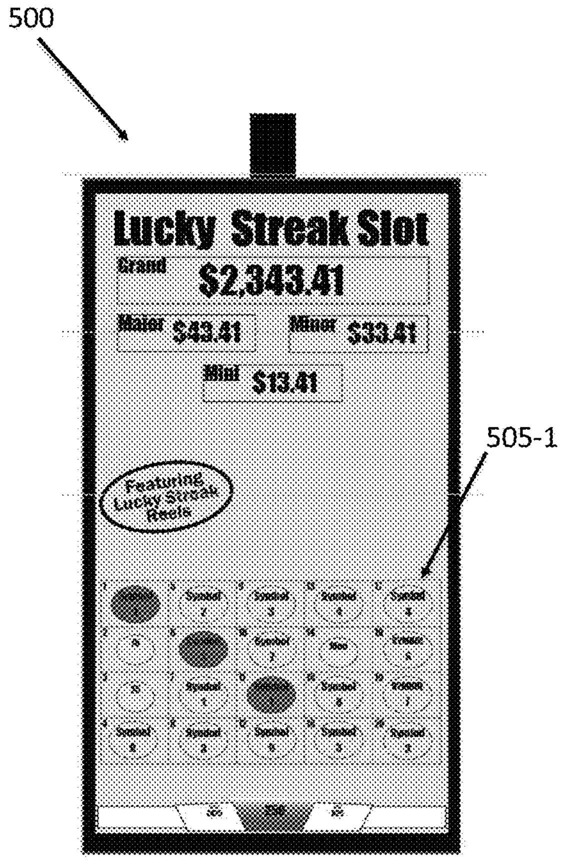
FIGS. 6A-6F illustrate one embodiment of the present invention in conjunction with a gaming machine according to the embodiments of the present invention.
Figure 6B:
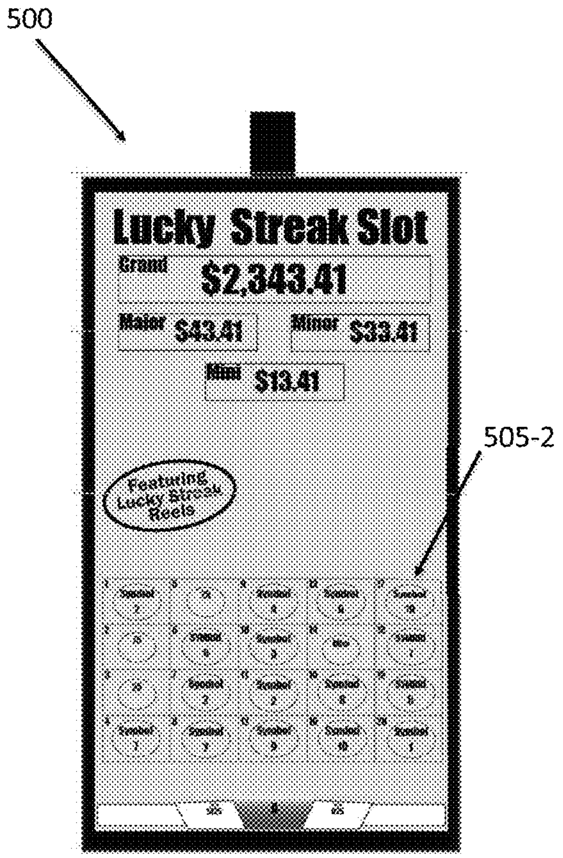
Figure 6C:
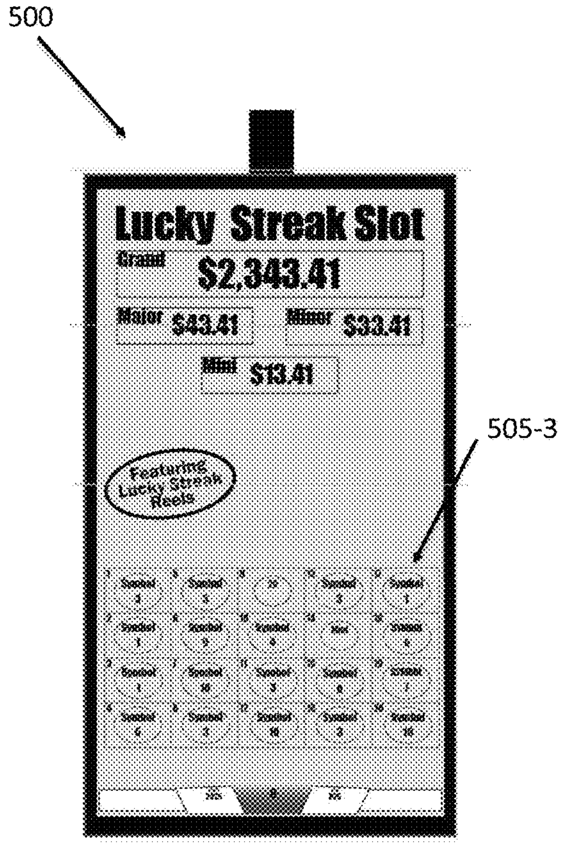
Figure 6D:
Figure 6E:
Figure 6F:

Now referring to FIGS. 6A through 6F, a slot-style EGM 500 is shown to further articulate the embodiments of the present invention. For purposes of FIGS. 6A through 6F, a finite pool comprises four losing outcomes and one winning outcome. FIG. 6A shows a first game play of the EGM 500 resulting in a winning outcome 505-1 based on the system selecting database A and a winning outcome. At this stage, the finite pool has only four non-winning outcomes remaining such that the next four game outcomes must be non-winning. FIG. 6B shows a second game play of the EGM 500 resulting in a non-winning outcome 505-2 based on the system selecting database B and a non-winning outcome. FIG. 6C shows a third game play of the EGM 500 resulting in a non-winning outcome 505-3 based on the system selecting database B and a non-winning outcome. FIG. 6D shows a fourth game play of the EGM 500 resulting in a non-winning outcome 505-4 based on the system selecting database B and a non-winning outcome. FIG. 6E shows a fifth game play of the EGM 500 resulting in a non-winning outcome 505-5 based on the system selecting database B and a non-winning outcome. Now, the finite pool is re-set with four losing outcomes and one winning outcome. FIG. 6F shows a sixth game play of the EGM 500 resulting in a non-winning outcome 505-6 based on the system selecting database B and a non-winning outcome. After this sixth play, the finite pool comprises three losing outcomes and one winning outcome.

The use of the finite pool to determine a winning or losing outcome permits an operator to reduce cold streaks. Table 1 below shows a chart of hit frequency percentage and the chances of consecutive losing outcomes. Such cold streaks are reduced by the embodiments of the present invention.

TABLE 1

| Loss in | Hit Frequency | | |
|---|---|---|---|
| a row | 20.00% | 25.00% | 30.00% |
| 1 | 80.0000% | 75.0000% | 70.0000% |
| 2 | 64.0000% | 56.2500% | 49.0000% |
| 3 | 51.2000% | 42.1875% | 34.3000% |
| 4 | 40.9600% | 31.6405% | 24.0100% |
| 5 | 32.7680% | 23.7305% | 16.8070% |
| 6 | 26.2144% | 17.7979% | 11.7649% |
| 7 | 20.9715% | 13.3484% | 8.2354% |
| 8 | 16.7772% | 10.0113% | 5.7648% |
| 9 | 13.4218% | 7.5085% | 4.0354% |
| 10 | 10.7374% | 5.6314% | 2.8248% |
| 11 | 8.5899% | 4.2235% | 1.9773% |
| 12 | 6.8719% | 3.1676% | 1.3841% |
| 13 | 5.4976% | 2.3757% | 0.9689% |
| 14 | 4.3980% | 1.7818% | 0.6782% |
| 15 | 3.5184% | 1.3363% | 0.4748% |
| 16 | 2.8147% | 1.0023% | 0.3323% |
| 17 | 2.2518% | 0.7517% | 0.2326% |
| 18 | 1.8014% | 0.5638% | 0.1628% |
| 19 | 1.4412% | 0.4228% | 0.1140% |
| 20 | 1.1529% | 0.3171% | 0.0798% |
| 21 | 0.9223% | 0.2378% | 0.0559% |
| 22 | 0.7379% | 0.1784% | 0.0391% |
| 23 | 0.5903% | 0.1338% | 0.0274% |
| 24 | 0.4722% | 0.1003% | 0.0192% |
| 25 | 0.3778% | 0.0753% | 0.0134% |
| 26 | 0.302.2% | 0.0564% | 0.0094% |
| 27 | 0.2418% | 0.0423% | 0.0066% |
| 28 | 0.1934% | 0.0317% | 0.0046% |
| 29 | 0.1547% | 0.0238% | 0.0032% |
| 30 | 0.1238% | 0.0179% | 0.0023% |
| 31 | 0.0990% | 0.0134% | 0.0016% |
| 32 | 0.0792% | 0.0100% | 0.0011% |
| 33 | 0.0634% | 0.0075% | 0.0008% |
| 34 | 0.0507% | 0.0057% | 0.0005% |
| 35 | 0.0406% | 0.0042% | 0.0004% |
| 36 | 0.0325% | 0.0032% | 0.0003% |
| 37 | 0.0260% | 0.0024% | 0.0002% |
| 38 | 0.0208% | 0.0018% | 0.0001% |
| 39 | 0.0166% | 0.0013% | 0.0001% |
| 40 | 0.0133% | 0.0010% | 0.0001% |
| 41 | 0.0106% | 0.0008% | 0.0000% |
| 42 | 0.0085% | 0.0006% | 0.0000% |
| 43 | 0.0068% | 0.0004% | 0.0000% |
| 44 | 0.0054% | 0.0003% | 0.0000% |

In comparison, a finite pool of five outcomes comprising one winning outcome and four losing outcomes (20% winning frequency) has a maximum number of consecutive losing outcomes eight (2 times four losing outcomes in the finite pool) as shown in Table 2 below.

TABLE 2

| OUTCOME | WINNING OUTCOMES REMAINING IN FINITE POOL | LOSING OUTCOMES REMAINING IN FINITE POOL |
|---|---|---|
| WINNING | ZERO | FOUR |
| NON-WINNING | ZERO | THREE |
| NON-WINNING | ZERO | TWO |
| NON-WINNING | ZERO | ONE |
| NON-WINNING/RE-SET | ZERO | ZERO |
| NON-WINNING | ONE | THREE |
| NON-WINNING | ONE | TWO |
| NON-WINNING | ONE | ONE |
| NON-WINNING | ONE | ZERO |
| WINNING/RE-SET | ZERO | ZERO |

Game math is established during the production phase and undergoes testing and certification. At present, operators have the flexibility to adjust the game's RTP (Return to Player) percentage, such as 92%, 94%, etc. However, the ability to modify the hit frequency is not currently available to the operator. However, the math models referenced herein do encompass different hit frequencies.

Although the invention has been described in detail with reference to several embodiments, additional variations and modifications exist within the scope and spirit of the invention as described and defined in the following claims.

I claim:

1. A gaming system comprising:

a finite pool database comprising multiple finite pools populated with winning and non-winning outcomes;

said multiple finite pools used to determine whether an associated game outcome is a winning outcome or non-winning outcome;

a first award database and second award database, said first award database containing awards associated with winning outcomes and said second award database containing awards associated with non-winning outcomes; and a random selector for selecting a finite pool from said multiple finite pools, a winning or non-winning outcome from said selected finite pool and/or awards from said first award database and/or said second award database.

2. The gaming system of claim 1 wherein said multiple finite pools, first award database and second award database are re-set once depleted.

3. The gaming system of claim 1 further comprising multiple finite pool databases, each one based on a bet and/or denomination being played.

4. The gaming system of claim 1 wherein said winning and non-winning outcomes relate to class II and III games.

5. The gaming system of claim 4 wherein said first award database and second award database are populated with bingo card outcomes for class II games.

6. The gaming system of claim 1 wherein said winning and non-winning outcomes relate to slot games or pull tab games.

7. A gaming method comprising:

creating a finite pool database comprising multiple finite pools populated with winning and non-winning outcomes;

creating said multiple finite pools comprising a number of winning outcomes and a number of non-winning outcomes;

selecting a finite pool from said plurality of finite pools;

using said selected finite pool to determine whether an associated game outcome is a winning outcome or non-winning outcome;

creating a first award database and second award database wherein said first award database contains awards associated with winning outcomes and said second award database contains awards associated with non-winning outcomes; and utilizing a random selector for selecting a finite pool from said plurality of finite pools, winning and non-winning outcomes from said selected finite pool and awards from said first award database and/or said second award database.

8. The method of claim 7 further comprising re-setting a selected finite pool once said number of winning outcomes and said number of non-winning outcomes are depleted.

9. The gaming method of claim 7 wherein said winning and non-winning outcomes relate to slot games or pull tab games.

10. The gaming method of claim 7 wherein said winning and non-winning outcomes relate to class II and III games.

11. The gaming system of claim 10 wherein said first award database and second award database are populated with bingo card outcomes for class II games.

12. The gaming method of claim 7 further comprising multiple finite pool databases, each one associated with a bet and/or denomination being played.

13. The gaming method of claim 7 further comprising replacing randomly selected awards associated with winning outcomes and replacing randomly selected awards associated with non-winning outcomes relative to a slot game.

14. The gaming method of claim 7 further comprising not replacing randomly selected awards associated with winning outcomes and not replacing randomly selected awards associated with non-winning outcomes relative to a pull tab game.

15. A gaming system for a slot game or pull tab game comprising:

a finite pool database comprising a plurality of finite pools populated with winning and non-winning outcomes;

said plurality of finite pools used to determine whether an associated game outcome is a winning outcome or non-winning outcome;

a first award database and second award database, said first award database containing awards associated with winning outcomes and said second award database containing awards associated with non-winning outcomes;

a random selector for selecting one of said plurality of finite pools, outcomes from a selected finite pool and awards from said first award database and/or said second award database;

wherein said finite pool is re-set once said number of winning outcomes and said number of non-winning outcomes are depleted;

wherein said awards are removed from said first award database and said second award database during a pull tab game; and wherein said awards are replaced in said first award database and said second award database during a class II or III game.

16. The gaming system of claim 15 wherein said multiple finite pools, first award database and second award database are re-set once depleted.

17. The gaming system of claim 15 further comprising multiple finite pool databases, each one associated with a bet and/or denomination being played.

18. The gaming system of claim 15 wherein said winning and non-winning outcomes relate to class II and III games.

19. The gaming system of claim 18 wherein said first award database and second award database are populated with bingo card outcomes for class II games.

* * * * *